(12) United States Patent
Demos et al.

(10) Patent No.: US 8,395,079 B2
(45) Date of Patent: Mar. 12, 2013

(54) METHOD AND SYSTEM FOR HIGH POWER REFLECTIVE OPTICAL ELEMENTS

(75) Inventors: Stavros G. Demos, Livermore, CA (US); Alexander M. Rubenchik, Livermore, CA (US); Raluca A. Negres, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 343 days.

(21) Appl. No.: 12/834,706

(22) Filed: Jul. 12, 2010

(65) Prior Publication Data

US 2012/0006796 A1 Jan. 12, 2012

(51) Int. Cl.
*B23K 26/00* (2006.01)
(52) U.S. Cl. ............ 219/121.6; 219/121.65; 219/121.66
(58) Field of Classification Search ............... 219/50, 219/121.11, 121.6, 121.65, 121.66
See application file for complete search history.

(56) References Cited

U.S. PATENT DOCUMENTS

| | | | |
|---|---|---|---|
| 3,371,287 A | 2/1968 | Haddad | |
| 4,758,533 A * | 7/1988 | Magee et al. | 438/662 |
| 7,233,010 B2 | 6/2007 | Van Herpen et al. | |
| 7,274,040 B2 * | 9/2007 | Sun | 257/79 |
| 7,482,609 B2 | 1/2009 | Ershov et al. | |
| 2003/0175020 A1 | 9/2003 | Fuchs et al. | |
| 2003/0228529 A1 | 12/2003 | Dieu et al. | |
| 2004/0164059 A1 | 8/2004 | Brehm et al. | |
| 2006/0093510 A1 | 5/2006 | Obata et al. | |
| 2006/0243712 A1 | 11/2006 | Haight et al. | |
| 2008/0203326 A1 * | 8/2008 | Neukirch | 250/504 R |

OTHER PUBLICATIONS

Draper, et al., Q-switched frequency-doubled Nd:YAG laser surface finishing of metals, Applied Optics, vol. 22, No. 17, pp. 2521-2522 (Sep. 1, 1983).

* cited by examiner

*Primary Examiner* — Khiem D Nguyen (57) ABSTRACT

A method of repairing damage in an optical element includes providing a laser system including at least one optical element having a coating layer having an incident light surface and directing a laser pulse from the laser system to impinge on the incident light surface. The method also includes sustaining damage to a portion of the incident light surface and melting the damaged portion of the incident light surface and a region adjacent to the damaged portion. The method further includes flowing material from the region adjacent the damaged portion to the damaged portion and solidifying the material in the damaged portion and the region adjacent to the damaged portion.

24 Claims, 5 Drawing Sheets

METHOD AND SYSTEM FOR HIGH POWER REFLECTIVE OPTICAL ELEMENTS

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Optical damage of optical elements is a problem presented by the operation of high power laser systems. Reflective optics are often used to direct laser beams by changing the direction of propagation (e.g., using mirrors) or to control the divergence of the laser beam (e.g., using lenses to focus the laser beam to a spot). Both refractive optical elements and reflective optical elements are widely used in laser systems.

Typically, laser systems utilize multi-layer dielectric mirrors that can be damaged during operation. Damage to dielectric mirrors can arise as a result of preexisting defects such as impurities, structural or lattice imperfections, or contamination. These preexisting defects can be embedded in the surface of the optic or can be present in the bulk of the material and can result from the manufacturing process or as a result of handling the optic. Damage can also arise as defects generated during the operation of the system or due to local field enhancements in the laser beam.

Despite progress made in the reliability of high power laser systems, there is a need in the art for improved methods and systems related to high power reflective optical elements.

SUMMARY OF THE INVENTION

According to the present invention, techniques related to optical systems are provided. More particularly, embodiments of the present invention relate to methods and systems of reflective optical elements that, after suffering laser and radiation induced damage, reverse the adverse effects of the damage using a healing process. In a particular embodiment, the adverse effects resulting from localized energy deposition by the laser pulse or by neutrons and/or x-ray photons are removed by melting and reformation of a metal reflective layer. The recovery process can either be activated spontaneously after damage initiation or can be initiated by an external activation source. The methods and systems described herein are also applicable to a variety of optical systems.

According to an embodiment of the present invention, a method of repairing an optical element is provided. The method includes providing a laser system including at least one optical element having an incident light surface adjacent an incident light surface region and exposing the incident light surface to at least one of neutrons or x-ray photons. The method also includes sustaining damage to at least a portion of the incident light surface region. The method further includes raising a temperature of at least the damaged portion of the incident light surface region, melting at least the damaged portion of the incident light surface, forming a melt region, and solidifying the melt region.

According to another embodiment of the present invention, a method of repairing damage in an optical element is provided. The method includes providing a laser system including at least one optical element having a coating layer having an incident light surface, directing a laser pulse from the laser system to impinge on the incident light surface, and sustaining damage to a portion of the incident light surface. The method also includes melting the damaged portion of the incident light surface and a region adjacent to the damaged portion and flowing material from the region adjacent to the damaged portion to the damaged portion. The method further includes solidifying the material in the damaged portion and the region adjacent to the damaged portion.

According to yet another embodiment of the present invention, a method of repairing a reflective optical element is provided. The method includes providing a laser system including at least one optical element having an incident light surface region comprising a reflective material and directing a laser pulse from the laser system to impinge on the incident light surface. The method also includes sustaining damage to a portion of the incident light surface region and melting at least the damaged portion of the incident light surface region. The method further includes solidifying the at least a portion of the incident light surface region.

Numerous benefits are achieved by way of the present invention over conventional techniques. For example, the present techniques provide optical elements that are suitable for replacing conventional optical elements in laser systems in which laser-induced or radiation-induced damage represents a limitation during operational conditions. A specific example of a system in which embodiments of the present invention can be utilized is a laser fusion system (e.g., the LIFE fusion energy system). Moreover, embodiments of the present invention provide methods for repairing optical elements that have been damaged by high energy radiation and/ or laser pulses. Additionally, embodiments of the present invention reduce system down time for repair, thereby reducing the cost of system operation and/or the manufacturing cost associated with a product (e.g., energy for the LIFE fusion energy system). Moreover, embodiments of the present invention reduce the cost of repair by providing methods and systems for fast and inexpensive repair. Some embodiments reduce or eliminate the need to replace expensive components after they sustain damage. Furthermore, embodiments of the present invention provide a new class of optical elements that are suitable for operation in adverse environments. These and other objects and features of the present invention and the manner of obtaining them will become apparent to those skilled in the art, and the invention itself will be best understood by reference to the following detailed description read in conjunction with the accompanying drawings.

DETAILED DESCRIPTION OF SPECIFIC EMBODIMENTS

The processes that occur during a damage event in the bulk and the surface region of optical elements are described below. The progression of the material response involves discrete steps of well-defined processes, with the duration of the entire event outlasting the duration of the damaging pulse by many orders of magnitude. The final spatial and structural characteristics of the damage site depend on the response of the host material to the localized energy deposited by the laser pulse. Therefore, altering and/or controlling the material modifications induced by a laser damage event can be accomplished by appropriately tailoring the properties of the host material to be able to reverse the effects of energy deposition and/or the design of multi-layered complex structures that can dissipate the energy in a manner that does not result in irreversible processes (i.e., damage).

In laser fusion systems, such as the LIFE fusion energy system, some optics, including the final optics, are directly exposed to both high power laser light as well as powerful neutron and x-ray fluxes, also referred to as high energy radiation. Damage to the optics at the microscale level can occur as a result of the absorption of laser light and subsequent heating of the material of the optics. For high power laser systems, such damage resulting from absorption of laser light can reduce the lifetime of the optics, resulting in system down time or costly repairs.

Additionally, exposure to high energy radiation can be an additional source of energy leading to damage of the optical elements. This damage can be directly caused by the neutrons and x-ray photons (e.g., structural damage inside the material of the optics on the nanometer scale). The presence of a radiation flux will likely lead to densification and structural changes in the material, including stresses and cracks, thus reducing the ability of the optical element to control and transmit or reflect the light with high efficiency. Structural changes to the optics as a result of exposure to high energy radiation can include swelling, bubble creation, and the like. Thus, although on a physical level, the damage to the material is on a nanometer scale, multiple damage events can combine to produce structural changes on scales larger than the nanometer scale. The interaction of defects initially generated by the high energy radiation with the laser pulse can also lead to additional energy deposition, which in turn, can accelerate the radiation induced damage processes or promote additional laser induced damage. Thus, the energy deposited in the optics by the laser pulses can enhance damage previously caused by the high energy radiation, resulting in additional laser-induced damage initiation and propagation. Additional description related to the LIFE fusion energy system is provided in commonly assigned and copending U.S. patent application Ser. No. 12/681,165, filed on Apr. 1, 2010, and entitled "Control of a Laser Inertial Confinement Fusion-Fission Power Plant," the disclosure of which is hereby incorporated by reference in its entirety.

In order to protect the final optics (i.e., the optics located at the output of the laser system) from high-energy radiation from the reactor, all but the final element can be positioned behind protective barriers. However, in some system designs, the final optical element that is designed to direct (and maybe focus) the laser light to the target will be inevitably exposed to radiation since a clear path between this final optical element and the ignition site must exist for the propagation of the laser beam. Thus, for these system designs, although a reduced number of optical elements are exposed to the neutron or x-ray photons, their performance should include characteristics such as: a) resistance to laser induced damage, b) resistance to alteration of optical properties, including transient and residual absorption, from exposure to neutrons and x-ray photons, and c) maintenance of these performance parameters over extended periods of time (e.g., on the order of a few months to many years) after exposure to a large number of high fluence laser pulses (e.g., on the order of $10^8$ to $10^{10}$ pulses). Some embodiments of the present invention provide a final optical element that provides these performance characteristics.

According to embodiments of the present invention, optical elements are provided that reduce or eliminate problems associated with laser induced damage through "self healing" of the optical element after it has sustained damage due to the adverse effects of localized energy deposition resulting from either a high power laser pulse or from neutron and/or x-ray photons. The damage caused to the reflective surface of the optical element by the laser pulse, neutrons, and/or x-ray photons is reversed utilizing embodiments of the present invention. The reduction/reversal of damage to the reflective surface, referred to as the "self healing" process, can be initiated either spontaneously after damage or with the aid of an external activation source. Additional description related to these processes and optical elements is provided throughout the present specification.

Some embodiments of the present invention utilize reflective optical elements having metal reflective surfaces, for either steering and/or focusing of light in an optical system. As an example, a reflective optical element as described herein could be utilized as the final optical element in a LIFE engine. The reflective layer, typically a metal alloy, will be supported by the surface of a substrate material and will be chosen to have a melting point close to the operating temperature of the laser system (which can be up to hundreds of degrees).

Figure 1:
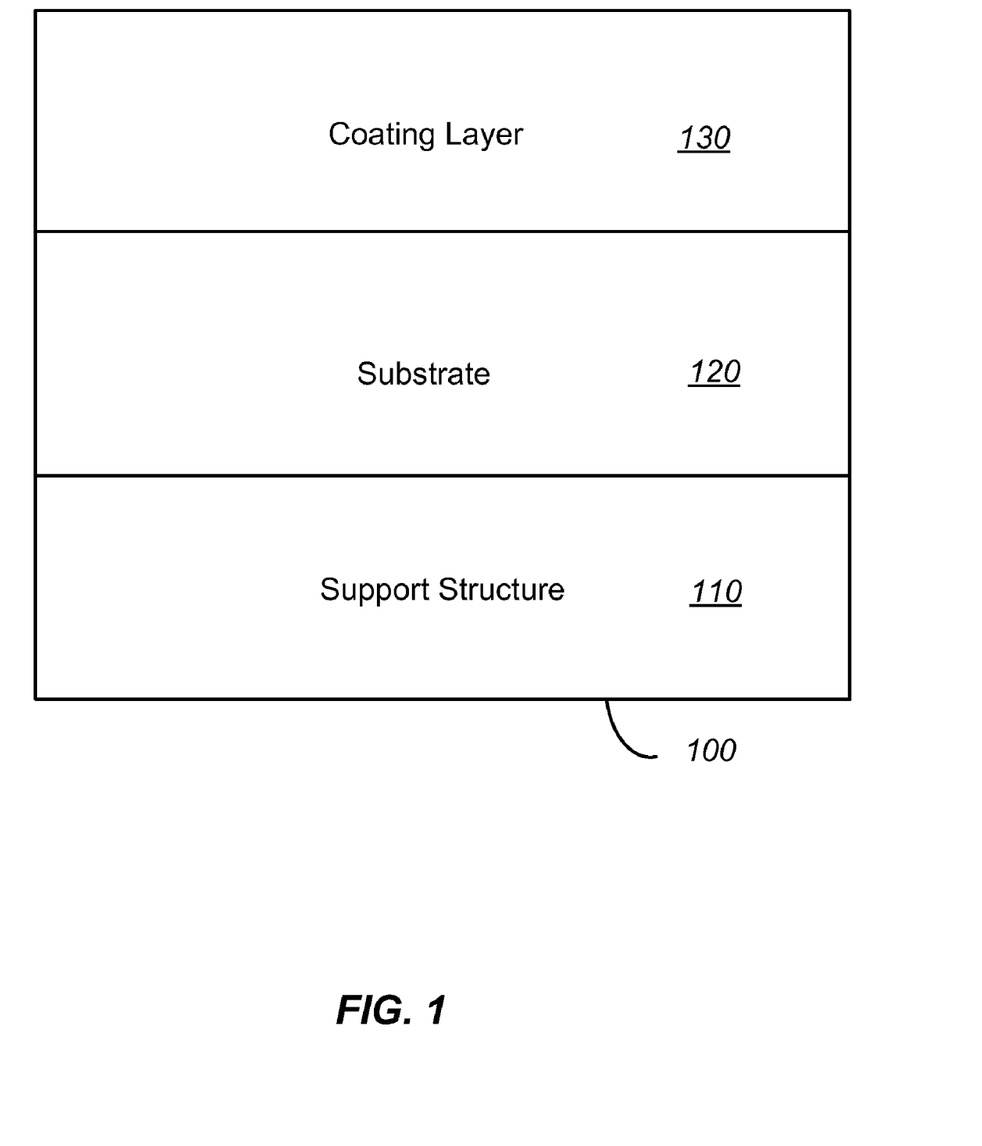
FIG. 1 is a simplified schematic diagram of an optical element according to an embodiment of the present invention.

FIG. 1 is a simplified schematic diagram of an optical element according to an embodiment of the present invention. The optical element 100, which is utilized as a reflective optical element in some embodiments, includes three components. A first component is a support structure 110, for example, a piece of glass. The support structure 110 provides mechanical support for overlying layers as well as a smooth bonding/deposition interface and can be made using any suitable material that provides mechanical support and resistance to damage from the operating environment. Other suitable materials for the support structure 110 include metals, alloys, ceramics, dielectrics or the like. Furthermore, the support structure can be equipped with adaptive optics components to provide some control of the shape of the surface.

Bonded to the support structure 110 is a substrate 120. A coating layer 130 is joined to the substrate 120, typically using a deposition process. During operation of the laser system, damage to the coating layer 130 can be removed using a "self-healing" process. As discussed more fully in relation to FIGS. 2-4, embodiments of the present invention utilize materials for the coating layer 130 that have a melting temperature just above the operating temperature of the laser system. For these materials, energy absorbed from the laser pulses incident on the optical element or neutrons and/or x-ray photons incident on the optical element during a damage event will produce a temperature rise that will convert a portion or all of the material in the coating layer from a solid to a liquid phase. The surface tension of the liquid material will reduce surface non-uniformities resulting from damage and thermal diffusion will lead to the material cooling back to a temperature less than the melting point, solidifying the material in a state with reduced damage. In addition to rearrangement of material at the liquid/air interface, internal rearrangement will occur at a depth into the material (e.g., a depth into the coating layer), referred to below as the incident light surface region.

The substrate 120 and the support structure 110 is selected to provide resistance to damage by neutrons, x-ray photons, and other high energy radiation. Suitable materials may include materials that are used in components of the LIFE engine, for example, materials such as ODS steel, which can be used in the chamber walls of the LIFE chamber. In addition to radiation damage resistance, the substrate 120 provides mechanical support for the coating layer 130 and forms a strong bond with support structure 110. The substrate 120 can be fabricated using fused silica, other suitable substrate material, combinations thereof, or the like.

Another function provided by the substrate is to smooth out damage experienced by the support structure and provide a high quality surface for the coating layer. To achieve these functions, the substrate should be able to compensate for and remove the effects of radiation damage on the support structure 110 and deal with radiation damage in a manner that does not compromise its surface quality. Due to exposure to neutrons and x-ray photons, the support structure 110 will be damaged, most likely resulting in changes in the morphology of the surface of the support structure joined to the substrate 120. As an example, the prolonged exposure to high energy radiation expected in a LIFE engine will result in changes in the support structure surface, which is initially flat. These changes can include roughening of the surface joined to the substrate due to cracks, bubbles, warpage, swelling, and the like. Thus, although FIG. 1 illustrates the support structure/substrate interface as smooth, embodiments of the present invention are not limited to this smooth surface and roughening of this surface is expected. Although the overall flatness or shape of the surface of the support structure maybe controlled using adaptive optics technologies including actuators or other type of elements, the quality of the surface at the microscopic level cannot generally be controlled with such technologies.

Therefore, one of the structural features provided by the substrate 120 is to provide a smooth surface for the coating layer 130. Thus, the materials for the substrate are selected to provide a buffer layer between the support structure surface, which is expected to become rough, and the coating layer. Additionally, the substrate 120 will resist damage resulting from exposure to high energy radiation, providing some or all of the self-healing properties discussed in relation to the coating layer. The self-healing properties of the substrate can be achieved as a result of exposure to the high energy radiation and laser pulses associated with operation of the laser system or by supplementary energy provided as part of a repair process. The melting temperature of the substrate will be higher than the melting temperature of the coating layer, so that the substrate can be healed separately from the coating layer. Using the self-healing properties discussed herein, the substrate is able to provide a substantially planar surface to support the coating layer. It should be noted that the main damage mechanism for the substrate is expected to be from exposure to high energy radiation such as neutrons. The localized increase of the temperature in the affected region of the substrate will activate the self-healing process discussed earlier. This will protect the substrate's surface from the cumulative effects of radiation damage. When the surface quality of the substrate/coating layer interface degrades and fails to meet specifications, the substrate can be heated to a temperature close to or above the melting temperature, thereby annealing or melting and resolidifying the substrate to improve the planarity of the substrate/coating layer interface. One of ordinary skill in the art would recognize many variations, modifications, and alternatives.

Laser induced damage or damage resulting from high energy radiation can cause damage to the substrate material up to tens of microns below the substrate/coating layer interface and will generally be a function of the laser parameters. For applications experiencing low levels of damage, the substrate material can include a wide variety of materials, including conventional substrates for optical elements such as $SiO_2$. For applications experiencing higher levels of damage, (e.g., for a subset of laser parameters or other reasons that laser damage initiation on the optical element may lead to removal of substrate material as a result of the laser-induced microexplosions), embodiments of the provide solutions to this damage.

A first option for substrates experiencing high levels of damage is that the self-healing mechanism used for the coating layer as discussed above can also be used to refill material removed from the substrate with the material of the coating layer in order to form a reflective surface after damage and self-healing that is of sufficiently high optical quality. A second option is repairing the surface of the substrate. As an example, after a number of damage events have caused deformation of the substrate surface so that the reflective optical element is performing below specifications, the surface of the substrate can be repaired. In one embodiment, the coating layer is melted and removed from the substrate, the substrate surface is repaired as described below, and a new coating layer is formed on the repaired substrate.

To repair the substrate surface in one embodiment, techniques similar to those used for repair of the coating layer are employed. Specifically, the substrate material is selected to have a melting point near the operating temperature, but above the melting point of the material used in the coating layer. In this way, the material in the reflective coating layer may be melted while maintaining the integrity of the substrate in an intact fashion. In order to repair the substrate, the temperature of the substrate is raised above the melting point of the substrate and a self-healing mechanism for the substrate, similar, if not identical) to that described above in relation to the coating layer is utilized. After the substrate surface is repaired, the new coating layer can be formed, for example, by deposition. A benefit provided by this substrate repair technique is that some of the same instrumentation and techniques employed for the repair of the coating layer can be employed in the substrate repair. As an example, the substrate could be fabricated using a similar material (e.g., a different gallium alloy) than that used for the coating layer, providing for similar repair techniques while still having sufficient thickness to absorb the impact of possible damage events that tend to propagate to the support structure. Utilizing embodiments of the present invention, the support material can be any material that provides resistance to radiation damage associated with the operational conditions of the laser system, for example, fused silica, other radiation resistant glasses, dielectric materials, metals, or the like. One of ordinary skill in the art would recognize many variations, modifications, and alternatives.

In some embodiments, the thickness of the substrate will depend on the damage experienced by the support structure. As the damage level experienced by the support structure, and corresponding roughness at the support structure/substrate interface increases, the thickness of the substrate increases in order to provide the buffering function described above. In exemplary embodiments, the support structure can range in thickness from about 1 cm to about 1 m, for example, 10 cm;

the substrate can range in thickness from a few microns to a few millimeters, for example, 10 µm, 20 µm, 30 µm, 40 µm, 50 µm, 100 µm, 200 µm, 300 µm, 400 µm, 500 µm, 1 mm, 2 mm, 3 mm, 4 mm, or 5 mm; and the coating layer can range in thickness from a few microns to hundreds of microns, for example, 1 µm, 2 µm, 3 µm, 4 µm, 5 µm, 10 µm, 15 µm, 20 µm, 25 µm, 30 µm, 35 µm, 40 µm, 45 µm, 50 µm, 75 µm, 100 µm, 150 µm, 200 µm, 250 µm, 300 µm, 400 µm, 500 µm, 750 µm, or 1 mm. These particular dimensions are provided merely by way of example and other dimensions can be utilized depending on the particular applications.

Embodiments of the present invention can utilize multiple different materials for the coating layer 130. As an example, some materials for the coating layer with a melting point near the operating temperature include gallium alloys that contain components designed to increase the reflectivity at specific wavelengths. Gallium is a chemical element with atomic number 31. The melting point of gallium (29.7646° C.) is slightly above room temperature. Gallium has been utilized in high temperature thermometric applications as well as for metal alloys with unusual properties of stability or ease of melting—some being liquid at room temperature (e.g., Ga—In eutectic: 75% Ga, 25% In, melting point=15° C.).

Gallium is one of the metals (along with cesium, rubidium, francium, and mercury) that are liquid at or near room temperature and can represent limited health and/or environmental risks. Additionally, the relative lack of chemical reactivity of gallium is appropriate for many laser system applications. Gallium is also notable for having one of the lowest liquid ranges for a metal and for having a low vapor pressure at high temperatures. In addition, liquid gallium metal wets glass and other ceramics and has been used to create brilliant mirrors. Gallium readily alloys with most metals by diffusing into their metal lattice, resulting in its use as a component in low melting temperature alloys as discussed above. Thus, the inventors have determined that these and other properties make gallium-based metal alloys suitable materials for use in the coating layer. Dopants to increase the reflectivity at particular wavelength(s) can also be utilized as discussed above.

Another material that is appropriate for the optical elements discussed herein is aluminum, which is widely used in the manufacturing of reflective coatings. Aluminum has a relatively low melting point of 660° C. and is easily alloyed with other metals, which can be useful in modifying the melting point to temperatures near the operating temperature. In addition to gallium, aluminum, gallium alloys, and aluminum alloys, other suitable materials are also included within the scope of the present invention.

Although the embodiment illustrated in FIG. 1 illustrates three solid layers, each of a single material, this is not required by embodiments of the present invention. In some implementations, the support structure is divided into sub-units mounted on actuators. Damage and roughness of the top surface of the support structure is compensated for by the actuators, which can independently piston the sub-units of the support structure in the vertical direction. Utilizing such actuators, changes in the support structure surface on the millimeter and centimeter scale can be compensated for by movement of the sub-units towards and away from the substrate. Moreover, laminar structures are included within the scope of the present invention. Merely by way of example, the substrate could be a layered structure utilizing glass and ODS ferritic steel to provide for radiation resistance and self-healing properties.

Figure 2:
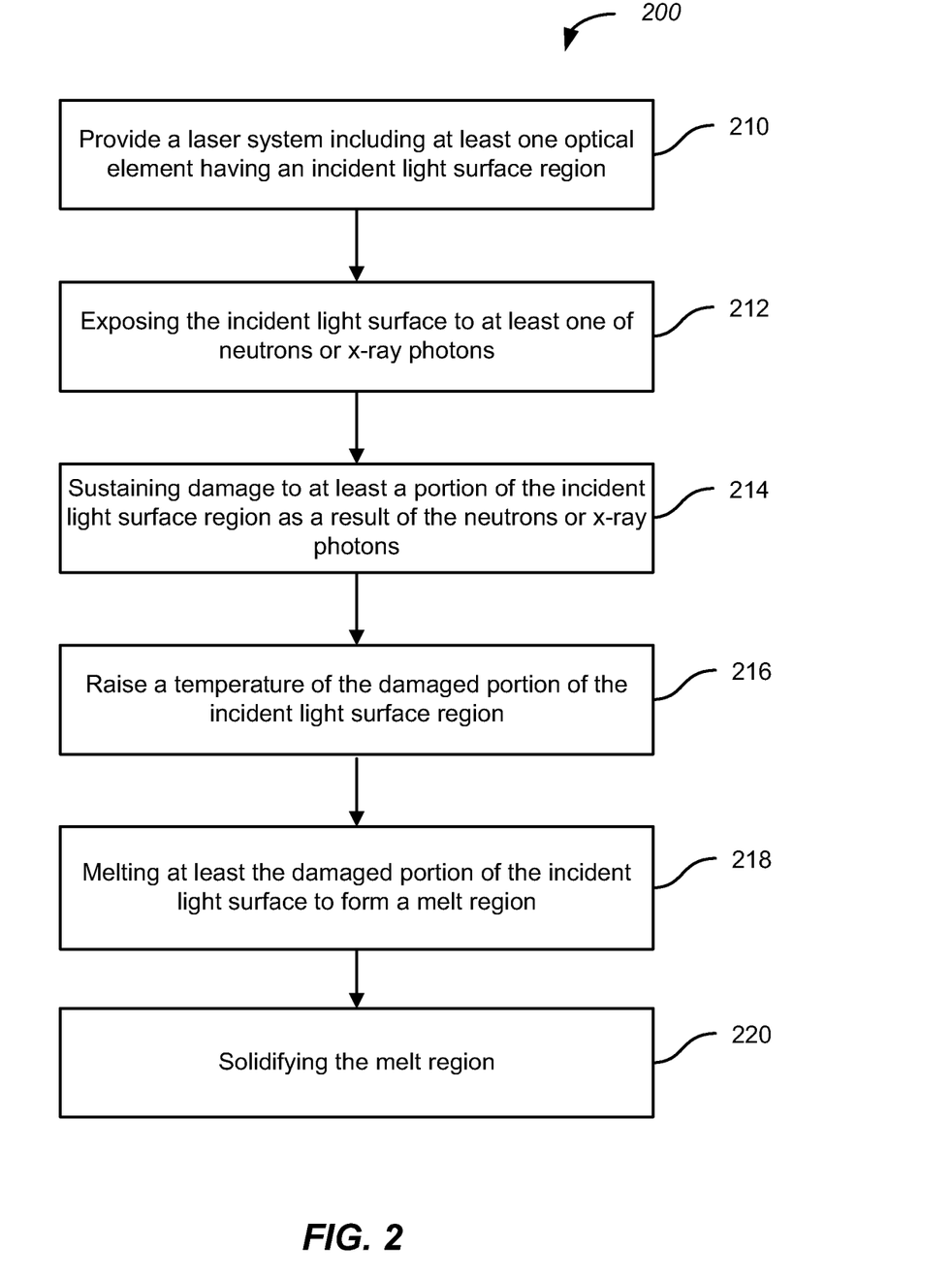
FIG. 2 is a simplified flowchart illustrating a method of repairing a reflective optical element according to an embodiment of the present invention.

FIG. 2 is a simplified flowchart illustrating a method of repairing a reflective optical element according to an embodiment of the present invention. In the embodiment illustrated in FIG. 2, the optical element is repaired in a self-healing manner when radiated by high energy radiation (e.g., neutrons or x-ray photons). According to embodiments of the present invention, the operating temperature of optical element is near, but below, the melting point of the material used in the optical element. Since the melting temperature is close to the operating temperature, energy incident on the optical element can be absorbed, raising the temperature of the optical element to the melting temperature, which enables the incident light surface region (i.e., the incident light surface and a region below the surface) of the optical element to melt and then resolidify (e.g., to recrystallize) in a manner to reduce damage sustained by the optical element.

The method 200 includes providing a laser system including at least one optical element having an incident light surface (210). In an exemplary embodiment, the laser system is a high power pulsed laser system, such as a laser system associated with a LIFE engine. The optical element has an incident light surface including a reflective material, for example, a metal or metal alloy. Referring to FIG. 1, the incident light surface is the upper surface of the coating layer 130. In an exemplary embodiment, the coating layer includes a reflective material such as a gallium alloy. The optical element will be exposed to laser pulses from the laser system, which impinge on the incident light surface. During operation of the laser system, the laser pulses produced by the laser system will impinge on the optical element, which provides for reflection of the pulses, focusing of the pulses, defocusing of the pulses, or the like. Thus, although FIG. 2 refers to impingement of a laser pulse, it will be appreciated that a series of laser pulses are contemplated by embodiments of the present invention.

In addition to exposure to laser pulses from the laser system, the optical element (e.g., the incident light surface region extending into the coating layer) is exposed to at least one of neutrons or x-ray photons (212). As a result of the impingement of the neutrons or x-ray photons, at least a portion of the incident light surface region sustains damage (214). In some embodiments, a portion of the energy in the neutrons or x-ray photons is absorbed by the reflective material at the incident light surface as well as in the region below the incident light surface, resulting in localized damage of the material structure. This process is accompanied by an increase of the localized temperature of the affected region of the material. As discussed above, damage from the neutrons or x-ray photons is typically on nanometer scale, but can result in larger damage regions as a result of aggregation of multiple damage sites. Referring to FIG. 1, the incident light surface region can be all or a portion of the coating layer 130.

The method further includes raising a temperature of the damaged portion of the incident light surface region (216). Raising the temperature can result from exposure of the optical element to laser pulses or at least one of neutrons or x-ray photons. In some applications, the neutrons and/or x-ray photons are produced by nuclear events associated with the system in which the laser system is integrated. As an example, for a LIFE fusion energy engine, neutrons are produced by the fusion process as well as x-ray photons. Although neutrons and x-ray photons are discussed in the exemplary embodiment illustrated in FIG. 2, other high energy particles and electromagnetic radiation are included within the scope of the present invention. The method also includes melting at least the damaged portion of the incident light surface region to form a melt region (218). In one embodiment, a portion or all of the emission from an energy source such as a radio frequency or light source is absorbed by the incident light surface region to form localized melt regions. In another embodiment, a portion of the laser pulses are absorbed to produce the melting. In other words, upon localized energy deposition by the laser pulses or other suitable energy source, the localized temperature of the damaged region of the incident light surface will exceed the melting point of the reflective material, for example, the metal or metal alloy.

Melting of the affected (such as damaged) localized region of the coating layer (including some or all of the coating layer) can result from thermal energy imparted by the high energy radiation or the laser pulses. Additionally, the thermal energy to raise the temperature of the coating layer from the operational temperature just below the melting point can be provided using other sources of energy, including exposure of all or part of the incident light surface to microwave, radiofrequency (RF), infrared (IR), ultraviolet (UV), or other type of radiation that can be used to deposit energy in a controlled manner in the material of the coating layer. As an example, a separate laser, light emitting diodes (LEDs), a high intensity lamp, an RF inductive coil, or the like could be provided to irradiate the surface and thereby raise the temperature. Thus, embodiments of the present invention are not limited to particular sources and methods of increasing the temperature of some or all of the coating layer and/or the substrate are included within the scope of the present invention.

As discussed in relation to FIG. 1, embodiments of the present invention utilize materials for the coating layer that have a melting temperature just above the operating temperature. For these materials, energy absorbed from the neutrons and/or x-ray photons will produce a temperature rise that will convert a portion or all of the material in the coating layer from a solid to a liquid phase. Using a gallium alloy as an example, the melting point of a particular gallium alloy is 30° C. If the operating temperature is 29.98° C., the high energy radiation can impart enough thermal energy to raise the localized temperature of the coating layer around the impact point by at least 0.02° C., melting all or a portion of the affected coating layer. The surface tension of the liquid material will reduce surface non-uniformities and/or modifications of the material structure at the atomic level resulting from damage after the material returns to a temperature less than the melting point, solidifying the material in a state with reduced damage. In addition to rearrangement of material at the liquid/air interface, internal rearrangement will occur at a depth into the material, referred to as the incident light surface region. Since the coating layer is typically fabricated using a liquid that is solidified, the melting and resolidification process discussed herein mimics the original fabrication process, resulting in optical quality surfaces after solidification.

As discussed above, the method further includes solidifying the melt region (220). The melted portion of the incident light surface will then solidify as the thermal energy is diffused to form a reflective surface with a smoother profile than the profile after damage from impact was sustained in optical design and material that does not possess the self healing properties discussed herein through the activation of the melting and re-solidification process. In addition to changes in surface morphology, the melting and subsequent solidification will typically serve to anneal the volume of melted material and potentially a surrounding region, reducing any adverse effects resulting from the interaction of the reflective material with the laser pulse or the neutrons and/or x-ray photons. Such annealing may also play a role in the improvement in surface morphology. Thus, the melting of the incident light surface and subsequent solidification (which may include re-crystallization) reduce or eliminate the damage that had been done to the incident light surface. In a specific embodiment, the damage to the incident light surface is reduced in that the depth of a recessed region produced during ablation by the laser pulse is reduced to less than 10 μm.

In some embodiments, the steps of melting and solidifying the material in the optical element are replaced by an annealing process in which energy is absorbed as a result of the exposure to an external energy source, raising the temperature of the damaged portion and thereby annealing the damaged portion to return the material to a pre-damage condition or reduce the amount of damage as a result of the thermal annealing process. Thus, although melting and resolidification are illustrated in FIG. 2, these steps are not required by embodiments of the present invention and may be replaced by a solid-phase annealing process. One of ordinary skill in the art would recognize many variations, modifications, and alternatives.

It should be appreciated that the specific steps illustrated in FIG. 2 provide a particular method of repairing a reflective optical element according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple substeps that may be performed in various sequences as appropriate to the individual step. Furthermore, additional steps may be added or removed depending on the particular applications. One of ordinary skill in the art would recognize many variations, modifications, and alternatives.

Figure 3:
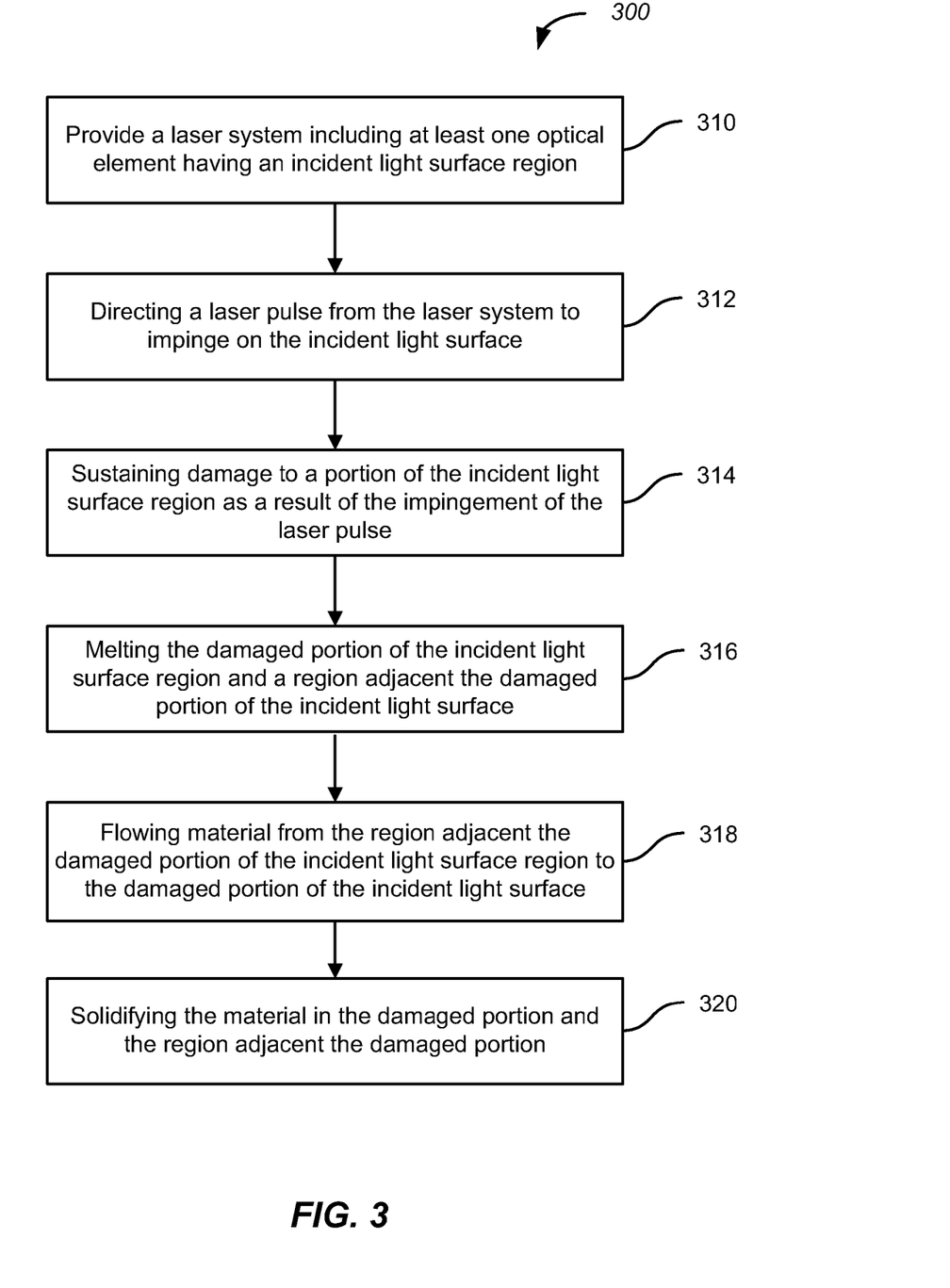
FIG. 3 is a simplified flowchart illustrating a method of repairing a reflective optical element of a laser system according to an embodiment of the present invention.

FIG. 3 is a simplified flowchart illustrating a method of repairing a reflective optical element of a laser system according to an embodiment of the present invention. The method 300 includes providing a laser system including at least one optical element having an incident light surface (310) and directing a laser pulse from the laser system to impinge on the incident light surface (312). In an embodiment, the incident light surface includes a metal material, for example, gallium. As discussed in relation to FIG. 2, one of a series of pulses in a pulse train can be directed at the reflective optical element. The method also includes sustaining damage to a portion of the incident light surface as a result of the impingement of the laser pulse on the incident light surface. A localized increase in the temperature of the surface of the optical element (on the order of 10,000 K-50,000 K) can be sufficient to result in laser damage, including cracking, morphology changes, and ablation or removal of material, including ejection of some of the reflective material from the incident light surface. In contrast with the damage resulting from high energy radiation, which is on the scale of nanometers, damage from laser pulses is typically on the order of microns up to millimeters.

Damage can include melting of the reflective material as well as ejection of at least a portion of the reflective material from the surface of the optical element, similar to a small micro-explosion. In some embodiments, damage to the incident light surface region includes formation of one or more pits or recessed regions with a depth ranging from about 1 μm to about 50 μm, for example, 5 μm, 10 μm, or 20 μm and a width ranging from about 1 μm in width to about 50 μm in width, for example, 5 μm, 10 μm, or 20 μm. Thus, the size of the damaged region will typically be on the micron scale. The damage to optical elements discussed herein includes, but is not limited to, formation of pits or recessed regions in the incident light surface.

After damage is sustained, the damaged portion of the incident light surface as well as a region adjacent to the damaged portion is melted (316). In an embodiment, the region adjacent to the damaged portion extends into the incident light surface by a predetermined distance and includes an area ranging from square microns to square millimeters surrounding the damaged portion. The melting of the material of the incident light surface region can result from the same laser pulse that caused the damage or a subsequent laser pulse or series of laser pulses as the impinge on the incident light surface. In an exemplary embodiment, the laser pulse is characterized by a power profile as a function of time other than a square pulse. Portions of the laser pulse cause damage to the incident light surface while other portions of the laser pulse provide the thermal energy to melt the damaged region and the region surrounding the damaged region. Thus, in addition to melting of the damaged material, the reflective material adjacent to and surrounding the damaged region will melt as a result of the local increase in the temperature arising from heat dissipation from the localized region where the laser energy deposition occurred.

The method further includes flowing material from the region adjacent the damaged portion to the damaged portion (318). After the material is melted, surface tension will provide a force for rearrangement of the melted reflective material on the surface in both the damaged region as well as the adjacent region. In the case where the reflective material has been ejected from the surface during the damage step, the flow of material from the region adjacent the damaged portion will help replenish the material lost from the damaged portion during ejection, thus removing some or all of the adverse effects associated with the laser damage process. The method also includes solidifying the material in the damaged portion and the region adjacent to the damaged portion (320).

In an exemplary embodiment, the laser pulse will produce ablation of the coating layer, with some of the material being expelled from the surface. The energy of the laser pulse, which caused the ablation, will also result in melting of the material adjacent to the ablated region since the operating temperature is near the melting temperature. The surface tension of the melted material will cause the crater left by the ablation to be filled in by the melted surrounding material. Droplets of hot liquid expelled during the ablation can reattach to the surface of the coating layer in liquid form, thereby resulting in melting of the surrounding material leading to incorporation of this droplet material back into the coating layer. The self-healing properties of the coating layer thus produce a surface after material reflow that is smoother than the surface immediately following the ablation process in materials that do not exhibit the self healing properties discussed above. Preferably, the surface of the coating layer, after resolidification, is identical to the surface after initial manufacturing. Additionally, the surface of the coating layer, after resolidification, is characterized by a smoothness less than a predetermined specification for the laser system.

It should be appreciated that the specific steps illustrated in FIG. 3 provide a particular method of repairing a reflective optical element of a laser system according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
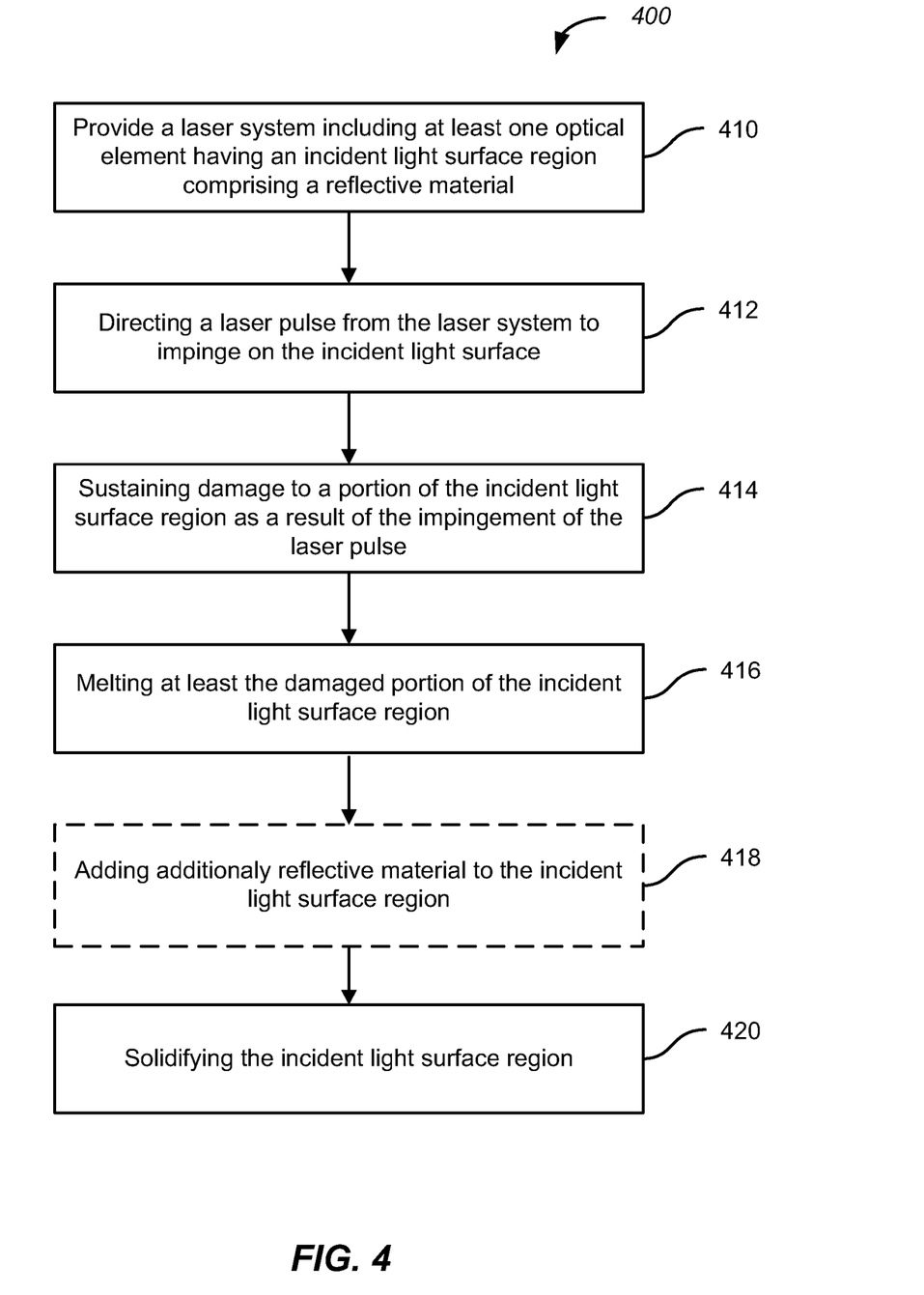
FIG. 4 is a simplified flowchart illustrating a method of repairing a reflective optical element of a laser system according to another embodiment of the present invention.

FIG. 4 is a simplified flowchart illustrating a method of repairing a reflective optical element of a laser system according to another embodiment of the present invention. As illustrated in FIG. 4, methods are provided that can be referred to as a rapid repair process in which after the optical element is damaged, the coating layer is melted, new material is added to the coating layer, and the coating layer is resolidified to repair the damaged surface. Motion of the optical element by, for example, spinning, vibration, or the like or other suitable method (e.g. delivery of ultrasound or other type of pressure waves) can be utilized during this rapid repair process to improve the uniformity and planarity of the reflective surface of the coating layer.

In some laser systems, multiple damage events to the optical element initiated within the same area will be sufficient in extent to prevent the self-healing properties discussed in relation to FIGS. 2 and 3 from returning the reflective surface to a profile meeting system specifications. As an example, if a large amount of material has been removed from the coating layer through ablation, the methods discussed in relations to FIGS. 2 and 3 will potentially become less effective. In such a case, the methods discussed in relation to FIG. 4 can be used to "recoat" the reflective surface of the optical element.

The method 400 includes providing a laser system including at least one optical element having an incident light surface region including a reflective material (410). The reflective material can be one of the materials discussed in relation to FIGS. 1-3, including metal materials such as a gallium alloy or aluminum. The method also includes directing a laser pulse from the laser system to impinge on the incident light surface of the optical element (412) and sustaining damage to a portion of the incident light surface region (414). Typically, the damage is in the form of ablation or removal of a portion of the reflective material present in the coating layer. The method further includes melting at least the damaged portion of the incident light surface region (416) and solidifying the at least a portion of the incident light surface region (420). In a specific embodiment, melting the damaged portion of the incident light surface region includes melting the entirety of the incident light surface region of the optical element. Melting of the coating layer can result from thermal energy associated with the laser pulse or as a result of additional energy provided by an external source. Such external sources include microwave sources, radiofrequency (RF) sources, infrared (IR) sources, ultraviolet (UV) sources, lasers, lamps, or the like.

In an embodiment, the rapid repair process illustrated in FIG. 4 can include an optional step of infusion of additional reflective material into the incident light surface region (to account for material loss as a result of ablation). In a particular embodiment, the additional reflective material is provided in the form of a liquid spray delivered by nozzles located at the perimeter of the optical element. The optical element may also be positioned on a rotating and/or vibrating platform to facilitate the uniform distribution of the liquid reflective material during the recoating process. It is envisioned that this rapid repair process may be performed while the optical element is still positioned in the laser system (during operation or during a brief pause in operation) or during a brief removal of the optical element from the laser system. In embodiments in which additional reflective material is added to the incident light surface region, solidifying the coating layer will include not only solidification of the damaged portion of the incident light surface region but also the additional reflective material. Thus, embodiments of the present invention provide methods and systems suitable for repairing damage to optical elements on the millimeter scale.

It should be appreciated that the specific steps illustrated in FIG. 4 provide a particular method of repairing a reflective optical element of a laser system according to another embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

According to embodiments of the present invention, the surface feature of the reflective surface of the coating layer after the rapid repair process is of higher optical quality than the surface feature prior to the rapid repair process. As an example, the surface roughness of the incident light surface of the optical element prior to sustaining damage is less than a specification for the optical element.

In some embodiments, contaminants and contamination can be removed from the coating layer during the rapid repair process. When the coating layer becomes contaminated by various particles/debris, the rapid repair process discussed in relation to FIG. 4 can be utilized in a manner than raises the entirety of the coating layer to a temperature above the melting point. The external sources, including lasers or lamps, as discussed throughout the present specification, can be used to provide the thermal energy to melt the coating layer. Contaminated material will be removed from the melt (for example, by flowing the contaminated material away from the remainder of the melt), additional reflective material will be added, for example, by spray coating, and the surface will be resolidified after the source of thermal energy is removed. One of ordinary skill in the art would recognize many variations, modifications, and alternatives. Such a rapid repair process can be performed in real time while the laser system is operating, while several shots from the laser system are blocked, or after removal from the laser system. Depending on the thickness of the coating layer, it may not be necessary to melt the entirety of the coating layer, but only an upper portion of the coating layer in order to remove the contaminants.

As discussed throughout the present specification, embodiments of the present invention utilize reflective materials that are operated at a temperature close to the melting temperature of these materials. An example coating layer is a metal material, such as a gallium alloy, formed in a thin layer on a substrate. In order to repair a damaged area on the reflective optical element, the temperature of the coating layer is increased above the melting point. Upon melting of the coating layer, the surface tension force can be used to drive the self-healing of surface deformations (e.g., a crater) produced as a result of ejection of material during a damage event. The same process can be used to smooth down the liquid metal debris that may be redeposited on the surface after ejection. The heating time utilized in embodiments of the present invention is short enough to not produce mirror deformation due to displacement of the coating layer as a result of the effects of gravity. For example, the typical relaxation time (t) of a surface disturbance with a scale l for a material with a surface tension of σ and a viscosity of η

$$t \approx \frac{\eta \cdot l}{\sigma}.$$

For many metals and metal alloys in liquid form, the surface tension σ is largely temperature independent and so is the viscosity η. As an example, for aluminum, a σ≈900 dyne/cm and η≈0.03 poise. Thus, for aluminum with a crater with size of about 100 μm, the relaxation time will be about 0.3 μs. This relaxation time is short enough so that gravity effects do not play a significant role in the melting and resolidification processes. In order to reduce effects due to gravity and other sources of nonuniformity, the optical element can be positioned on a rotating and/or vibrating and/or moving platform in order to achieve an optimal redistribution of the reflective material as well as optimal beam control characteristics for the beams providing the energy to melt the coating layer. For some embodiments, the melting resulting from either high energy radiation or laser pulses will be sufficient to reconstruct the initial structure of material in the coating layer.

According to an alternative embodiment of the present invention, a liquid reflective surface is utilized in place of the coating layer. In this alternative embodiment, the operating temperature is kept above the melting point of the reflective material, thereby not utilizing energy for activation since the reflective surface is already in a liquid state. Effects due to gravity can be compensated for by rotating and/or vibrating and/or moving the optical element using a platform for achieving optimal redistribution of the reflective material and optimal beam control characteristics. In these implementations, the substrate material will exist in the solid phase.

It should be noted that in embodiments utilizing a liquid reflective surface, the substrates discussed herein, which have the ability to be self-healing, provide benefits not available using conventional substrates. For some liquid mirror designs, the flatness of the substrate impacts the optical quality of the liquid mirror surface. Utilizing embodiments of the present invention, damage to the substrate can be repaired, providing improvements in substrate surface flatness in comparison with conventional substrates. By removing roughness resulting from high energy radiation or laser pulse damage, performance of these liquid mirrors is improved.

Figure 5:
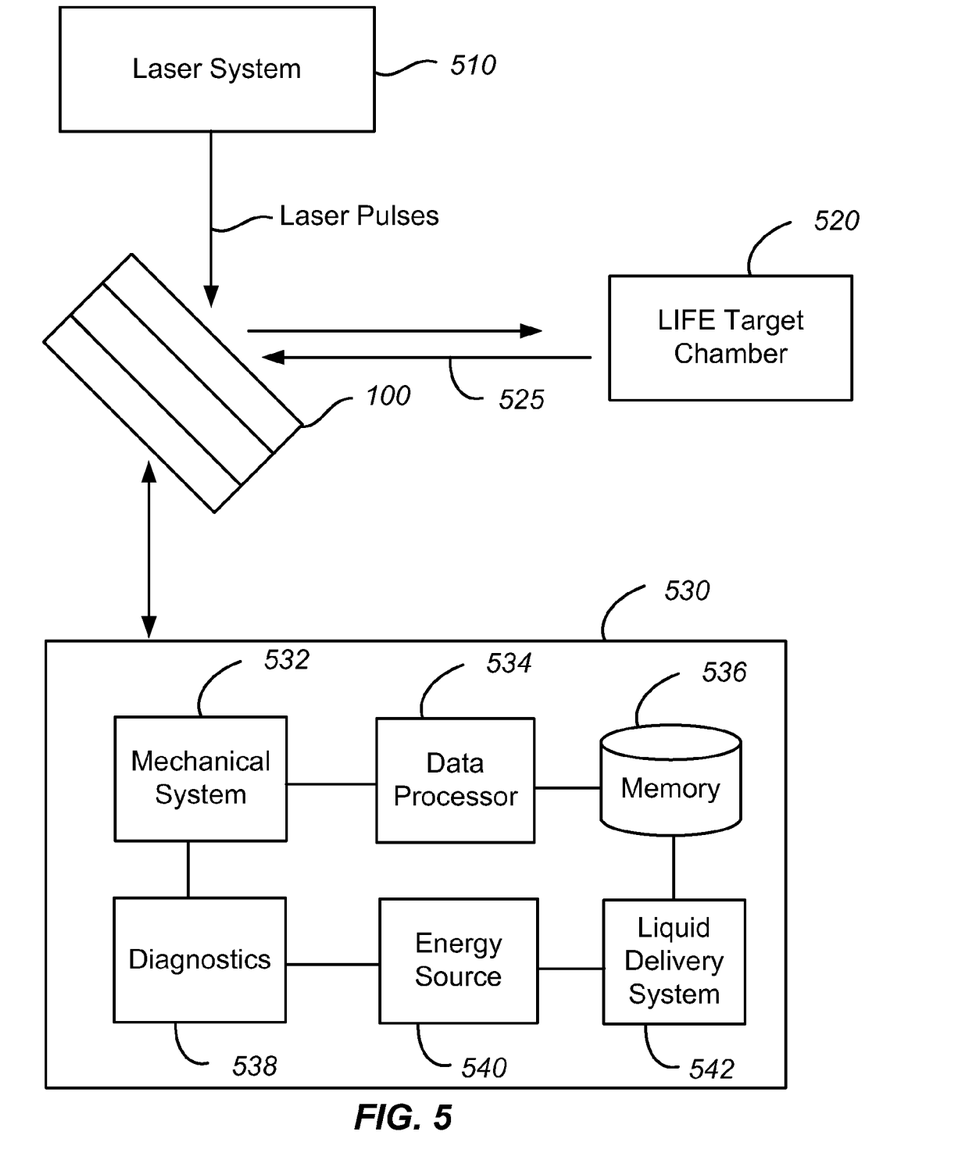
FIG. 5 is a simplified schematic diagram of a system for repairing damage to optical elements according to an embodiment of the present invention.

FIG. 5 is a simplified schematic diagram of a system for repairing damage to optical elements according to an embodiment of the present invention. Referring to FIG. 5, a laser system 510 generates laser pulses (or CW emission) that is incident on the optical element 100. As discussed in relation to FIG. 1, some optical elements provided according to embodiments of the present invention utilize a three-layer structure, with a support structure, a substrate, and a coating layer. Such a three-layer structure is illustrated in FIG. 5. Laser pulses from the laser system 510 reflects off the optical element 100 and can damage the optical element at high fluence levels. After reflection off of the optical element, the laser pulses are directed to a LIFE target chamber 520 in the embodiment illustrated in FIG. 5. As a result of the fusion processes occurring in the LIFE target chamber 520, neutrons and x-ray photons are generated and directed toward the optical element 100, as illustrated by beam path 525. The neutrons and x-ray photons can produce damage in the optical element as well as enhance damage processes resulting from exposure to the laser pulses.

Although a LIFE target chamber producing neutrons and x-ray photons is illustrated in FIG. 5, embodiments of the present invention are not limited to this particular application. In some high average power laser systems, embodiments of the present invention could be utilized to provide a self-healing function in response to damage from laser light propagating in the system. In other applications in which high energy radiation is incident on optical elements, embodiments of the present invention can be utilized. Therefore, although integration with the LIFE engine is discussed herein, embodiments of the present invention are not limited to this particular application. One of ordinary skill in the art would recognize many variations, modifications, and alternatives.

In order to effect one or more of the self-healing processes described herein, the optical element 100 is mechanically coupled to repair system 530. The repair system 530 includes several elements utilized in facilitating the self-healing processes described throughout the present specification. A mechanical system 532 includes support systems as well as actuators to position the optical element as appropriate to the particular application. As an example, rotation and vibration of the optical element can be performed using elements of the mechanical system 532. A data processor (also referred to as a processor) 534 and a memory 536 are provided and can act as a controller for the repair system 530.

The data processor 534 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The memory 536 can be local or distributed as appropriate to the particular application. Memory 536 may include a number of memories including a main random access memory (RAM) for storage of instructions and data during program execution and a read only memory (ROM) in which fixed instructions are stored. Thus, memory 536 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

Diagnostics 538 are provided that can measure the temperature of various system components, the amount of energy in the laser pulses, the amount and type of damage to the coating layer and/or substrate of the optical element, and the like. Such diagnostics can include cameras, thermocouples, IR sensors, power meters, position sensitive detectors, imaging detectors, phase measurement detectors, and the like. As an example, under the control of the data processor, measurements are made using the diagnostics 538 and adjustments are then made to the orientation of the optical element by the mechanical system 532.

In order to provide additional thermal energy to the coating layer and/or the substrate in some embodiments, an energy source 540 is also provided as part of the repair system 530. The energy source, which can be directed toward the optical element using optics (elements of the mechanical system) if the energy source is a laser. The energy source can be any suitable source that can deliver thermal energy to the optical element (e.g., through absorption processes) including sources of microwave, RF, IR, or UV energy. LEDs, lasers, high intensity lamps, RF inductive coils, and the like can be utilized depending on the particular application. One of ordinary skill in the art would recognize many variations, modifications, and alternatives.

In the embodiment illustrated in FIG. 4, additional reflective material is added to the coating layer in optional step 418. A liquid delivery system 542 is thus illustrated in FIG. 5, which may include one or more nozzles located at the perimeter of the optical element and adapted to spray additional reflective material onto the coating layer of the optical element. Other liquid delivery systems are included within the scope of the present invention and spray nozzles are merely discussed as an exemplary system.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a system including an optical element, the method comprising:
   providing a laser system including the one optical element, wherein the optical element has an incident light surface adjacent an incident light surface region;
   exposing the incident light surface to high energy particles or electromagnetic radiation;
   sustaining damage to at least a portion of the incident light surface region;
   raising a temperature of at least the damaged portion of the incident light surface region in response to the high energy particles or electromagnetic radiation;
   melting at least the damaged portion of the incident light surface in response to the high energy particles or electromagnetic radiation;
   forming a melt region; and
   solidifying the melt region.

2. The method of claim 1 wherein the incident light surface comprises a metal material.

3. The method of claim 2 wherein the metal material comprises a metal alloy.

4. The method of claim 2 wherein the metal alloy comprises a gallium alloy.

5. The method of claim 1 wherein raising a temperature of at least the damaged portion comprises exposing the incident light surface to one or more laser pulses.

6. The method of claim 1 wherein raising a temperature of at least the damaged portion comprises exposing the incident light surface to additional electromagnetic radiation.

7. The method of claim 6 wherein the melt portion comprises the damaged portion and a region surrounding the damaged portion.

8. The method of claim 1 wherein the high energy particles or electromagnetic radiation comprise at least one of neutrons, x-ray photons, or a laser pulse.

9. A method of repairing damage in an optical element, the method comprising:
   providing a laser system including at least one optical element having a coating layer having an incident light surface;
   directing a laser pulse from the laser system to impinge on the incident light surface;
   sustaining damage to a portion of the incident light surface in response to the laser pulse;
   melting the damaged portion of the incident light surface and a region adjacent to the damaged portion in response to the laser pulse;
   flowing material from the region adjacent the damaged portion to the damaged portion; and
   solidifying the material in the damaged portion and the region adjacent to the damaged portion.

10. The method of claim 9 wherein the coating layer comprises a metal material.

11. The method of claim 10 wherein the metal material comprises a gallium alloy.

12. The method of claim 9 wherein sustaining damage to the incident light surface comprises removing a portion of the coating layer.

13. A method of repairing a reflective optical element having an incident light surface and an incident light surface region adjacent the incident light surface, the method comprising:
- providing the reflective optical element, wherein the reflective optical element comprises a reflective material and a damaged portion of the incident light surface region;
- directing a laser pulse to impinge on the incident light surface;
- depositing excess energy from the laser pulse during a damage event;
- forming a damaged portion of the incident light surface region in response to the damage event;
- melting at least the damaged portion of the incident light surface region in response to the damage event; and
- solidifying at least a portion of the incident light surface region.

14. The method of claim 13 further comprising adding additional reflective material to the incident light surface, wherein solidifying a portion of the incident light surface region includes solidifying the additional reflective material.

15. The method of claim 14 wherein adding additional reflective material comprises spraying the additional reflective material onto the incident light surface of the reflective optical element.

16. The method of claim 13 wherein the reflective optical element further comprises a substrate adjacent the incident light surface region, the method further comprising:
- melting at least a portion of the substrate; and
- solidifying the at least a portion of the substrate.

17. The method of claim 16 further comprising adding additional substrate material to the substrate.

18. The method of claim 17 wherein adding additional substrate material comprises spraying the additional substrate material onto the substrate.

19. The method of claim 16 wherein melting at least a portion of the substrate comprises depositing excess energy during a damage event in the substrate sufficient to convert at least the portion of the substrate into a liquid phase.

20. The method of claim 16 wherein a melting point of the incident light surface region is lower than a melting point of the substrate.

21. The method of claim 13 wherein the reflective material comprises a metal material.

22. The method of claim 13 wherein melting at least the damaged portion of the incident light surface region comprises melting the entirety of the incident light surface region.

23. The method of claim 13 wherein melting at least the damaged portion of the incident light surface region occurs in response to directing the laser pulse to impinge on the incident light surface.

24. The method of claim 13 wherein the excess energy deposited during the damage event converts the damaged portion into a liquid phase.

* * * * *